United States Patent Office 3,380,627
Patented Apr. 30, 1968

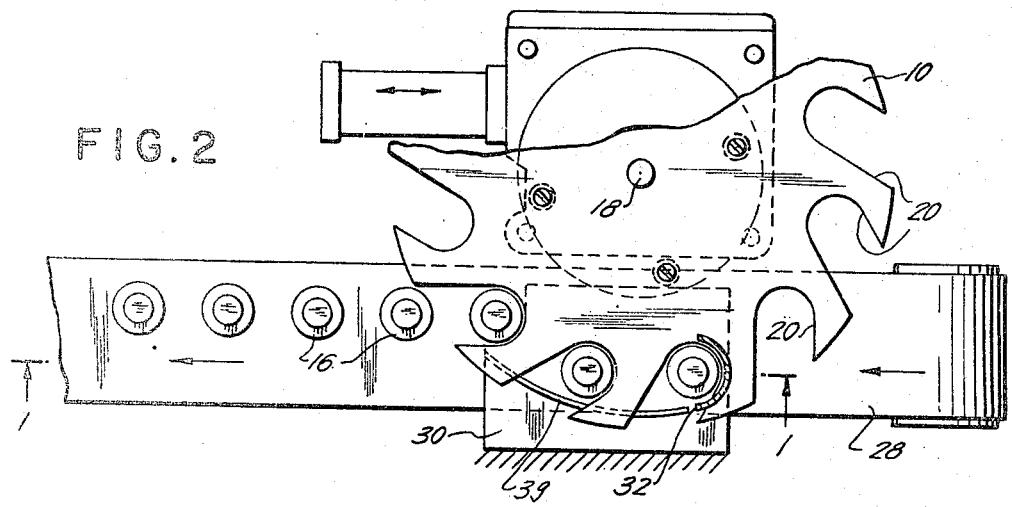
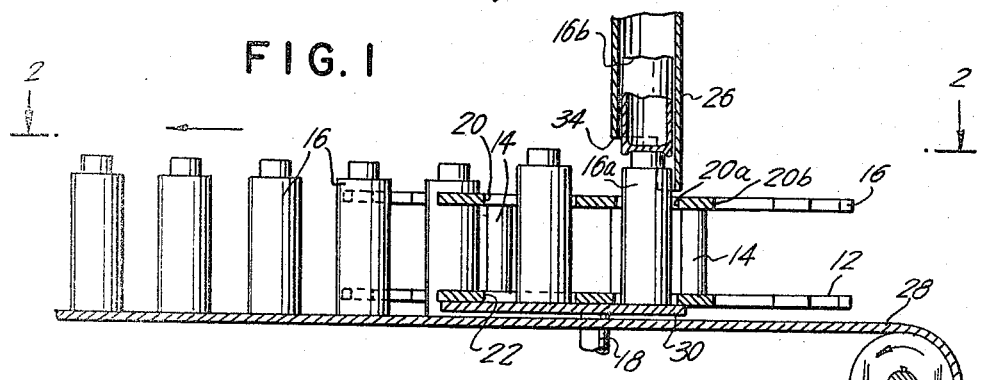
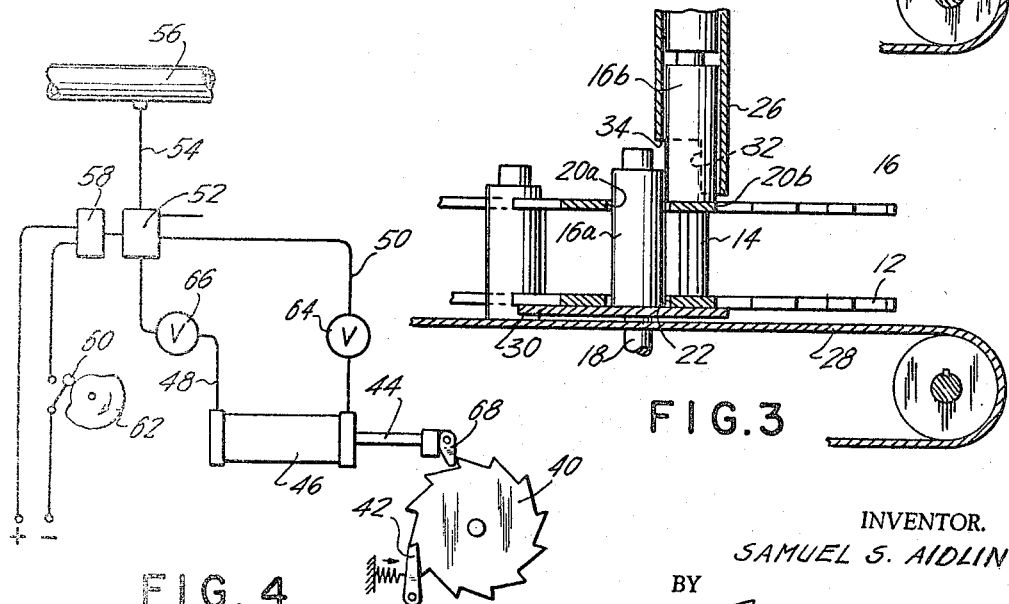

3,380,627
APPARATUS FOR RECEIVING AND CONVEYING ORIENTED ARTICLES FROM ORIENTING AND FEEDING APPARATUS
Samuel S. Aidlin, 214 Beaumont St., Brooklyn, N.Y. 11235
Filed Oct. 22, 1965, Ser. No. 501,735
19 Claims. (Cl. 221—224)

The present invention relates to an automatic apparatus for conveying automatically fed oriented articles, particularly bottles or the like, from an automatic feeding and orienting apparatus to a point of use or processing; and more particularly, for receiving and conveying such articles from a hopper type feeding and orienting apparatus such as shown and described in my copending applications, Ser. No. 226,102, filed Sept. 25, 1962; Ser. No. 421,509, filed Dec. 28, 1964; and Ser. No. 436,527, filed Mar. 2, 1965; now respectively matured into Patents Nos. 3,254,-753, dated June 7, 1966; 3,249,203, dated May 3, 1966; and 3,295,659, dated Jan. 3, 1967.

In my said copending applications I have shown and described the several hopper types of feeding apparatus for feeding bottles or the like, in oriented position; namely, with bottoms foremost so that they may be in an upright position on a receiving surface.

While such apparatus has been highly effective for the purpose, certain difficulties have been experienced in connection with their use. Thus, the said bottles are generally landed on a conveyor for transporting toward a point of use such as filling, capping or labelling apparatus. As the conveyor is in constant motion, difficulties have been experienced in assuring that a fed bottle received thereupon will remain in upright position, without toppling over. This difficulty has been especially bothersome with light weight plastic bottles, of the type currently in use; especially when landing on a belt conveyor the belt of which has a degree of resilience which may cause a degree of unbalance in the bottle landing on the conveyor.

In many instances it is also desirable to feed the bottles to a station in evenly spaced relation to one another as well as at regularly spaced and timed intervals. Of course, feeding and orienting apparatus, of the character described, in my said copending applications, do not and cannot provide such regulated feeding in time and space.

The present invention is directed to the provision of means, in the form of auxiliary apparatus for receiving and conveying oriented articles fed from apparatus such as described in my said copending applications, which will assure, both, that the bottles fed to the conveyor belt will remain in upright position on the conveyor belt and that they will be moved thereby in regulated spaced and timed relation to their point of use or processing.

It is another object of the present invention to provide auxiliary conveying apparatus, of the character described, which may be controlled as to spacing and timing, from a remote point, as from apparatus to which the bottles or the like are being conveyed for processing.

It is still another object of the present invention to provide auxiliary apparatus, of the character described, which is of relatively simple construction and economical to produce.

It is a further object of the present invention to provide auxiliary conveyor apparatus, of the character described, which is relatively compact and requiring little if any, space additional to that occupied by the feeding apparatus proper.

It is a still further object of the present invention to provide auxiliary conveyor apparatus, of the character described, which is highly efficient and effective in its operation.

The foregoing and other objects and advantages of the present invention will be come more readily apparent to those skilled in the art from the embodiment thereof shown in the accompanying drawings and from the description following. It is to be understood, however, that such embodiment is shown by way of illustration only, to make the principles and practice of the invention more readily comprehensible, and without any intent of limiting the invention to the specific details therein shown.

In the drawings:

FIG. 1 is a vertical section, partly elevational view of the bottle conveying apparatus of the present invention, taken on line 1—1 of FIG. 2; the lowermost of two bottles shown in conveying position;

FIG. 2 is a top plan view of the apparatus of FIG. 1 with the vertical tubular chute portion omitted;

FIG. 3 is a fragmentary vertical sectional view, similar to that of FIG. 1, with the two bottles shown in a preceding position; and FIG. 4 is a schematic view showing the indexing means for the apparatus of the present invention as controlled from a remote point.

Referring now in greater detail to the apparatus of the invention illustrated in the drawings the same is shown to comprise a star wheel preferably formed of a pair of wheels, 10 and 12, connected in spaced parallel relation to one another, as by spacing elements 14, a distance apart equal to less than the height of the body of a bottle 16 which it is intended to convey but encompassing a substantial part of such height. The star wheels are mounted for rotation in horizontal plane on a shaft 18 which may be vertically supported in any desired manner not thought necessary to be here shown.

The star wheels 10 and 12 are formed with regularly spaced registering recesses 20 and 22 respectively, in their edges; such recesses being preferably U-shaped of a width and shaped to accommodate the thickness of the bottom of a bottle 16 at their inner end and having preferably parallel sides which may be disposed at an angle to a radius of the wheel passing through them.

The star wheels 10 and 12 are disposed in position to have their recesses 20 and 22 each pass in vertical alignment with the opening of a vertically supported tubular chute 26 which may be connected to and form the terminal of an outlet chute of a bottle feeding and orienting apparatus such as the hopper feed type of bottle feeding orienting apparatus described in my copending applications.

A conveyor belt 28 is mounted under a lower marginal edge portion of the star wheels 12 parallel thereto and in position to underlie the outlet end of the tubular chute 26. The conveyor is preferably disposed parallel to a line that is tangent to the star wheels 10 and 12 and is spaced a short distance below the lower star wheel 12. A platform 30 is supported in any suitable manner, intermediate the underside of star wheel 12 and above the conveyor belt 28.

Formed in the wall of the tubular chute 26 at its lower end and opening into its lower edge and facing the direction of rotation of the star wheels 10 and 12, is an escape cut-away or recess 32. The escape recess 32 is of a width adapted to admit or to pass therethrough the upper portion of the bottle 16 and its upper edge is disposed a distance above the lower star wheel 12 less than the height of a bottle and a distance above the platform 30 slightly greater than the height of the bottle. The platform may be of a width to underlie the portion of the star wheel 12 to a point where the side of the recesses 20 and 22 passing over it reach a point parallel to the longitudinal axis of the conveyor belt.

Means are provided, such as will hereinafter be described for the intermittent rotation of the star wheels 10 and 12 successive distances equal to the distance between the inner ends of adjacent pairs of recesses 20 and 22, so that all pairs of recesses 20 and 22 may be successively brought into register with the bottom openings of the chute tube 26. It will now be apparent that when bottles 16, received in chute 26, are fed by gravity through the chute tube 26, the lowermost of the bottles 16a will drop through one set of openings 20a and 22a to rest upon the platform 30, the next succeeding bottle 16b will rest on top of bottle 16a. As star wheels 10 and 12 are rotated through the described distance of the next intermittent movement, bottle 16a will be moved by the engaging recesses 20a and 20b and through the openings 32 away from the bottom of the overlying bottle 16b, so that the latter will first drop on the star wheel portion 36, that separates the recesses 20a and 22a from the adjacent set of recesses 20b and 22b to the rear thereof. In this position the upper portion of the bottle 16b will be retained within the chute as will all bottles above it.

As the first intermittent movement is continued to its termination, bottle 16b will slide over the surface of the starwheel section 36 until the termination of the intermittent movement, when the rear pair of recesses 20b and 22b come into alignment with the chute tube 26, to permit the bottle 16b to drop down through such next pair of recesses to rest upon the platform 30 in the previous position of a bottle 16a.

As the intermittent movement of the star wheels 10 and 12 continues the first set of recesses 20a and 22a will be moved over platform 30 until their sides are parallel to the longitudinal axis of the conveyor belt 28 and the bottle 16a between them will have been moved off the edge of the platform 30 onto the conveyor belt 28 by which it will be moved out of the recesses 20 and 22 during the interval when the star wheels are at rest.

It may be here stated that, if desired, platform 30 may be omitted from the apparatus, and the bottles 16 dropped directly on the conveyor belt 28. It may her also bee stated that, if desired, a curved guide-rail, 39, may be provided on the apparatus to maintain bottle 16 within recesses 20 and 22 until they reach the appropriate position over conveyor belt 28, especially when recesses 20 and 22 are not formed and disposed as described herein but are disposed in a general radial position. Such guiderail 39 may be mounted directly on platform 30, as illustrated, or otherwise supported on the apparatus.

One arrangement for imparting intermittent movement to the star wheels 10 and 12, capable of being controlled from a remote point, is more or less diagrammatically illustrated in FIG. 4 of the drawings. Such arrangement is shown to consist of an index wheel 40, concentrically mounted on shaft 18 with star wheels 10 and 12, with the radial side of its teeth facing away from the direction of movement of star wheels 10 and 12, and, of a pawl 42, which is suitably supported to engage the radial side of the teeth against counter-rotation. The index wheel 40 is arranged to be moved intermittently a suitable distance by the piston, 44, to a two-way air cylinder, 46, that is connected at its ends by conduits, 48 and 50 to a two-way valve, 52, which is in turn connected by conduit, 54, to a source of compressed air indicated by the air tube 56. The air valve 52 is controlled by a solenoid, 58, connected in an electric circuit which includes a normally open switch, 60, that may be intermittently closed by the rotary cam, 62. The conduits include each a check valve, 64 and 66, respectively. It will be apparent that when the higher surface of the rotary cam 62 closes the circuit to the solenoid 58, the valve 52 is conditioned to connect either one of the conduits 48 or 50, as conduit 48, for instance, to admit air into the cylinder 46 at its rear end to move the piston 44 outwardly and to engage one of the teeth of the index wheel 40 to rotate it a distance which will cause star wheels 10 and 12 to rotate the distance between the adjacent of recesses 20 and 22, as cam 62 is continued to rotate to be disengaged from switch 60, solenoid 58 will automatically return to the original position so that valve 52 will connect with conduit 50 to admit air to the other end of the air cylinder to retract the piston 44 into position for the pivoted pawl 68 to engage against the radial side of the next succeeding entering tooth in readiness for the succeeding rotation of the index wheel 40.

It will be clear that cam 62 may be mounted on an electric motor that may be excited by or timed with the operation of the processing apparatus to which the bottles 16 are fed for the next operation that may be performed upon or with them. Such apparatus may, for instance, be a filling, capping or labeling machine, and switch 60 may be incorporated into such secondary apparatus and cam 62 may be actuated by a moving part of said apparatus. As the manner of controlling solenoid 58 does not constitute a part of the present invention and such control may take many different forms, it is not thought necessary to specifically illustrate any one of them.

This completes the description of the conveyor apparatus of the present invention. It will be readily apparent that such apparatus is of relatively inexpensive and simple construction. It will also be apparent that it is relatively compact and, since the star wheel is installed directly below the hopper feed apparatus, it will occupy a minimum of additional space.

It will be further apparent that the apparatus of the invention is highly effective for its purpose of receiving and keeping bottles, or the like, discharged from an orienting hopper feed device, in oriented, upright position while being transferred; primarily for the reason that the bottles moved by the star wheel to the conveyor belt are moved at a speed substantially equal to the speed of the conveyor belt when the latter takes over and removes them from the star wheel. It will be additionally apparent that such bottles, or the like, will be advanced in regularly spaced and at regularly timed intervals, at a relatively steady but high rate of speed, to a succeeding station for the purpose of succeeding processing on the bottles.

It will be further apparent that numerous modifications and variations may be made in the conveyor of the present invention, in accordance with the principles thereof hereinabove set forth, and without the exercise of any inventive ingenuity, by anyone skilled in the art. I desire, therefore, to be protected for any and all such modifications and variations that may be made within the spirit of the invention and scope of the claims hereto appended.

What I claim is:

1. Apparatus for automatically conveying articles discharged from feeding apparatus having an outlet chute to a remote point of destination, comprising, in combination, an upright tubular chute section arranged to receive articles from said outlet chute, a constantly moving conveyor below said tubular chute, at a distance from the outlet opening thereof not less than the height of one of said articles, and rotatably movable means intermediate the conveyor and said tubular chute, at a distance from the outlet opening thereof less than the height of an article, for intermittently receiving and advancing an article from said tubular chute onto said conveyor.

2. The conveying apparatus of claim 1, wherein said movable means comprises a rotatably supported star wheel having article enclosing spaced recesses in its edge, said star wheel arranged to successively aline said recesses with the bottom opening of said tubular chute.

3. The conveying apparatus of claim 1, including means for intermittently moving said movable means, said moving means including an electric circuit having a switch connected therein, and means, controllable from a remote point, for intermittently opening and closing said switch.

4. The apparatus of claim 1, wherein said outlet opening of said tubular chute includes a recess formed in the wall of said tubular chute and opening into the lower edge thereof and said conveyor is disposed at a distance from said lower edge less than the height of an article, but not less than the height of an article from the inner end of said recess.

5. Apparatus for automatically receiving and moving articles discharged from feeding apparatus having an outlet chute to a point of destination, comprising, in combination, a star wheel, an upright shaft mounting said star wheel for rotation at a distance from the outlet opening of said chute less than the height of an article, means for rotating said star wheel in intermittent movement, said star wheel having a plurality of regularly-spaced article-receiving recesses in its marginal edge portion, each opening into the edge thereof, said star wheel disposed to have its recesses intermittently successively register with the outlet opening of said outlet chute as it is intermittently rotated, a continuously moving conveyor below said marginal edge portion of said star wheel in position to receive thereon articles from successive of said recesses and to move them out of said recesses, said conveyor disposed at a distance from the outlet opening of said chute not less than the height of an article.

6. The conveying apparatus of claim 5, wherein said star wheel comprises spaced upper and lower wheels, said article-receiving recesses formed in each of said wheels, said wheels interconnected with their recess in vertical register.

7. The apparatus of claim 5, wherein a guard rail is provided alongside of said star wheel to retain the articles within said recesses, said guard rail extending to a point where the opening of each of said recesses faces the direction of movement of said movable conveyor.

8. The conveying apparatus of claim 5, wherein a platform is interposed between said conveyor and the underside of said star wheel, said platform extending from a point; underlying the opening of said tubular chute to a point registering with the inner end of a recess whose opening faces the direction of movement of said conveyor.

9. The conveying apparatus of claim 5, wherein the means for imparting intermittent rotary movement to said star wheel includes an indexing wheel mounted on said shaft and electrically actuated means successively engaging teeth of said indexing wheel for rotating the same, said electrically actuated means including an electric circuit having a switch connected therein and remotely controllable means for automatically alternately opening and closing said switch.

10. The apparatus of claim 5, wherein said outlet opening of said outlet chute includes a recess formed in the wall of said chute and opening into the lower edge thereof, and said conveyor is disposed at a distance from said lower edge less than the height of an article, but not less than the height of an article from the inner end of said recess.

11. Apparatus for translating articles discharged from feeding apparatus having an outlet chute to a remote point of destination, comprising a substantially vertical chute section associated with said outlet chute, a constantly moving conveyor below said tubular chute section at a distance from the outlet opening thereof not less than the height of an article, a platform over said conveyor below said chute section at a distance from the outlet opening thereof not less than the height of an article and means intermediate said chute section and said platform and at a height from said chute less than the height of an article for intermittently releasing and moving, at regular space and time intervals, an article from said chute section onto said conveyor.

12. The apparatus of claim 11, wherein said outlet opening of said tubular chute includes a recess formed in the wall of said tubular chute and opening into the lower edge thereof and said conveyor is disposed at a distance from said lower edge less than the height of an article, but not less than the height of an article from the inner end of said recess.

13. The apparatus of claim 11, wherein said article-releasing and moving means comprises a star wheel, means mounting said star wheel for rotation, with the marginal edge portion thereof underlying said chute section, said star wheel having a plurality of evenly-spaced article-receiving recesses formed in its said marginal edge portion, said recesses opening into the edge thereof.

14. The apparatus of claim 13, wherein said star wheel comprises a pair of wheel members secured to one another in spaced, parallel relation, each said wheel member having said recesses formed therein in register with a recess in the other.

15. The apparatus of claim 14, wherein the means mounting said star wheel for rotation comprises a shaft, an indexing wheel mounted on said shaft, and electrically-actuated means successively engaging teeth of said indexing wheel for rotating the same, and wherein said electrically actuated means includes an electric circuit having a switch connected therein and remotely controllable means for automatically alternately opening and closing said switch.

16. The apparatus of claim 13, wherein each said recess is of substantially U-shape with its inner end disposed below said chute section in position to receive an article discharged therefrom and having its sides substantially parallel to one another and disposed at an angle to a radius of said star wheel passing through said recess.

17. The apparatus of claim 16, wherein said platform underlies said marginal edge portion of said star wheel and extends from a point below said chute section to a point where said sides of said recesses are parallel to the direction of movement of said conveyor.

18. The apparatus of claim 11, wherein said platform underlies said marginal edge portion of said star wheel and extends from a point below said chute section to substantially a point wherein each said recess has its opening facing the direction of movement of said conveyor.

19. Apparatus for automatically receiving and conveying to a point of destination articles fed from a feeding apparatus, comprising a chute associated with said feeding apparatus adapted to discharge articles received therein in substantially upright position, a star wheel, means mounting said star wheel for rotation with its marginal edge portion underlying the outlet opening of said chute, said star wheel having a plurality of regularly spaced article-receiving recesses formed in its said marginal edge portion, each opening into the edge thereof, said star wheel disposed at a distance from the outlet opening of said chute less than the height of an article, a constantly moving conveyor below said star wheel at a distance from said outlet opening not less than the height of an article, and arranged to receive thereon articles from successive of said recesses and to move them out of said recesses, as said conveyor is moved and said star wheel is rotated, said recesses of substantially U-shape and having their inner end portion disposed to register with the outlet of said chute and having their sides substantially parallel to one another and at an angle to a radius of the star wheel passing through them.

References Cited

UNITED STATES PATENTS

| | | | |
|---|---|---|---|
| 1,522,717 | 1/1925 | Frost | 198—25 |
| 1,946,452 | 2/1934 | Bridges | 198—135 |
| 2,386,043 | 10/1945 | Everett | 198—25 |
| 2,529,777 | 11/1950 | McInnis | 198—135 |
| 2,496,438 | 2/1950 | Brandt | 198—35 |

FOREIGN PATENTS

| | | |
|---|---|---|
| 30,181 | 1/1963 | Germany. |
| 286,739 | 2/1965 | Netherlands. |

EDWARD A. SROKA, *Primary Examiner.*

EVON C. BLUNK, *Examiner.*